United States Patent [19]

Schievelbein

[11] 4,318,816
[45] Mar. 9, 1982

[54] SURFACTANT WATERFLOODING ENHANCED OIL RECOVERY METHOD USING STABILIZED SURFACTANT SOLUTION

[75] Inventor: Vernon H. Schievelbein, Houston, Tex.

[73] Assignee: Texaco Inc., White Plains, N.Y.

[21] Appl. No.: 189,554

[22] Filed: Sep. 22, 1980

Related U.S. Application Data

[63] Continuation-in-part of Ser. No. 776,406, Mar. 10, 1977, abandoned.

[51] Int. Cl.$^3$ .............................................. E21B 43/22
[52] U.S. Cl. ............................... 252/8.55 D; 166/275
[58] Field of Search ................. 252/8.55 D; 166/274, 166/275

[56] References Cited

U.S. PATENT DOCUMENTS

| | | | |
|---|---|---|---|
| 3,474,865 | 10/1969 | Gogarty et al. | 166/274 |
| 3,506,070 | 4/1970 | Jones | 166/274 |
| 3,827,496 | 8/1974 | Schroeder | 166/273 |
| 3,977,471 | 8/1976 | Gale et al. | 252/8.55 X |
| 3,983,940 | 10/1976 | Carpenter | 252/8.55 X |

*Primary Examiner*—Herbert B. Guynn
*Attorney, Agent, or Firm*—Carl G. Ries; Robert A. Kulason; Jack H. Park

[57] ABSTRACT

Surfactant waterflooding in oil formations containing high salinity water, e.g. water whose salinity is in excess of 50,000 part per million total dissolved solids and whose temperatures exceed about 100° to 150° F. is accomplished by injecting into the formation an aqueous solution of an alkylarylpolyalkoxyalkylene sulfonate containing a stabilizing amount of a normally liquid hydrocarbon. The amount of hydrocarbon employed is less than 1% and below the amount which would form a discrete discontinuous hydrocarbon zone, i.e. less than the amount of hydrocarbon which forms a conventional emulsion is employed to stabilize the surfactant-containing solution.

14 Claims, 7 Drawing Figures

SURFACTANT WATERFLOODING ENHANCED OIL RECOVERY METHOD USING STABILIZED SURFACTANT SOLUTION

CROSS REFERENCE TO RELATED APPLICATION

This is a continuation-in-part of copending application Ser. No. 776,406, filed Mar. 10, 1977, now abandoned for "A Method For Increasing The Stability of an Aqueous Solution of Surfactant."

BACKGROUND OF THE INVENTION

Field of the Invention

This invention relates to a method for recovering oil from subterranean formations by surfactant water flooding using a stabilized surfactant solution. In another embodiment, the invention relates to a method for stabilizing a solution of surfactant by incorporating a very small amount of hydrocarbon in that solution, the amount being less than the amount of hydrocarbon which would form a conventional oil-in-water microemulsion emulsion.

BACKGROUND OF THE INVENTION

Petroleum is normally recovered from subterranean formations in which it has accumulated by penetrating said formations with one or more wells and pumping or permitting the petroleum to flow to the surface through these wells. Recovery of petroleum from petroleum-containing formations is possible only if certain conditions are satisfied. There must be an adequately high concentration of petroleum in the formation and there must be sufficient porosity and permeability or interconnected flow channels throughout the formation to permit the flow of fluids therethrough if sufficient pressure is applied to the fluid. When the subterranean petroleum-containing formation has natural energy present in the form of an underlying active water drive, or gas dissolved in the petroleum which can exert sufficient pressure to drive the petroleum to the producing wells, or a high pressure gas cap above the petroleum within the petroleum reservoir, this natural energy is utilized to recover the petroleum. Recovery of petroleum by utilization of natural energy is referred to as primary recovery. When this natural energy source is depleted, or in the instance of those formations which did not originally contain sufficient natural energy to permit primary recovery operations, some form of supplemental or enhanced recovery process must be utilized in order to extract additional petroleum from the subterranean petroleum-containing formation. Supplemental recovery is frequently referred to as secondary recovery, although in fact it may be primary, secondary or tertiary in sequence of employment.

Water flooding, which involves injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 discloses the use of polyglycol ether as a surface active agent or surfactant to increase the capillary displacement efficiency of an aqueous flooding medium. U.S. Pat. No. 3,302,713 discloses the use of petroleum sulfonate prepared from the 850°–1050° F. boiling range fraction of petroleum crude as a surfactant for use in oil recovery operations. U.S. Pat. No. 3,468,377 describes the use of petroleum sulfonates of a specified molecular weight for oil recovery. U.S. Pat. No. 3,858,656 describes a dual surfactant system usable in the presence of waters containing high concentrations of calcium and/or magnesium ions. The above-enumerated patents disclose surfactant systems whereby more than one surfactant at a time is used in the aqueous medium to recover oil. This has several disadvantages the most serious of which is separation of the surfactants or disturbing a critical balance between them caused by different absorption rates. Recently the literature has reflected an effort to develop single surfactants which do not require a solubilizer or co-surfactant. U.S. Pat. No. 3,977,471 is an example of the single surfactant approach.

However, the single surfactant systems have a very serious disadvantage. Fluids containing the surfactants which are otherwise the preferred surfactants are not always stable. That is, the surfactant tends to separate from the aqueous solution causing loss of activity and increasing handling problems.

More specifically, it has been observed that the single surfactants separate from the bulk of the solution as a second aqueous surfactant phase more highly concentrated in surfactant and more viscous than the bulk of the solution. A single phase, homogenous fluid is preferred to assure uniform activity. The object of the present invention is to provide a method for stabilizing a single surfactant aqueous solution so it will remain homogenous over a time period similar to the time that the fluid remains in the formation.

The present invention is an improvement over the micellar dispersions which have been the subject of numerous patents in recent years. Micellar dispersions are generally oil external, that is, water-in-oil emulsions, to obtain miscibility with the petroleum in the oil bearing reservoirs. As shown in U.S. Pat. No. 3,504,744 these emulsions are unstable and additives, in this case sodium sulfate, must be added to render the emulsions stable. The present invention is based on the discovery, not taught in the prior art, that a critical, minute amount of hydrocarbon in an aqueous surfactant solution lends stability to that solution while allowing it to retain its aqueous surfactant solution character.

DESCRIPTION OF THE PRIOR ART

The following U.S. Patents describe related processes to that disclosed in this application. U.S. Pat. No. 3,977,471, Gayle et al., and U.S. Pat. No. 3,827,496, Schroeder describe related oil recovery processes. Also relevant are U.S. Pat. Nos. 3,474,865; 3,506,070; 3,983,940; 4,018,278; and 3,981,361.

SUMMARY OF THE INVENTION

This invention concerns a surfactant water flooding enhanced oil recovery process suitable for use in high salinity, high temperature environments. The primary oil recovery fluid injected into the formation will be a saline, aqueous liquid solution of a sulfonated ethoxylated surfactant having the following formula:

wherein $R_1$ is an alkyl radical having from 5 to 20 and preferably from 8 to 14 carbon atoms, $R_2$ and $R_3$ are each independently hydrogen, methyl, or alkyl radials having from 5 to 20 and preferably 8 to 14 carbon atoms, $R_4$ is ethylene or a mixture of ethylene and higher alkylene such as propylene with relatively more ethylene than higher alkylene, x is a number from 1 to 10 and preferably 2 to 8, $R_5$ is ethylene, propylene, hydroxypropylene, or butylene, and M is a monovalent cation, preferably sodium, potassium or ammonium.

An example of a preferred surfactant within the scope of the above description is a sodium or ammonium nonylbenzenetetraethoxyethylene sulfonate or sodium or ammonium dodecylbenzenetetraethoxyethylene sulfonate. This is a preferred surfactant for use in formations containing water whose salinity is in the range from about 50 to about 100,000 parts per million total dissolved solids. The aqueous fluid, will also contain, in addition to the above described surfactant, from 0.001 to 0.75% and preferably from 0.01 and 0.5% by weight of hydrocarbon such as C 6 to C 16 and preferably C 8 to C 14 paraffinic hydrocarbons, or distilled fractions of crude oil such as kerosine, natural gasoline, naphtha, diesel oil, etc. The amount of hydrocarbon should be sufficient to prevent separation of distinct phases from the aqueous solution, and should be less than the amount which promotes the formation of an emulsion.

DESCRIPTION OF THE PREFERRED EMBODIMENTS

My invention concerns a surfactant water flooding oil recovery process, especially one suitable for use in formations containing high salinity water, e.g. water whose salinity is in excess of 50,000 parts per million total dissolved solids, and which formation temperatures exceed about 150° F. In low temperature, low salinity water-containing oil formations, less expensive surfactants such as water soluble petroleum sulfonates may be employed satisfactorily. When the salinity exceeds 50,000 part per million, petroleum sulfonates are unsatisfactory and other types of surfactants must be used. Nonionic surfactants as well as sulfated and ethoxylated surfactants may be employed in high salinity formations so long as the temperature does not exceed 150° F. At higher tempertures, the nonionic surfactants become insoluble and the sulfated and ethoxylated surfactants hydrolyze so quickly that they cannot be used under these conditions. Accordingly, under the high temperature, high salinity conditions described above, the surfactant must be a sulfonated and ethoxylated surfactant.

Ordinarily, surfactant water flooding is applied to formations which have already been depleted as far as is economically feasible by primary recover, and in most instances, the formation will also have been water flooded to an economical limit. Although not essential, this is the common practice followed today in exploiting oil containing formations. Ordinarily, enhanced oil recovery operations make use of a plurality of injection wells and production wells spacially arranged in pattern such as five spot patterns, which comprise injection wells on the corners of a square grid with a production well located at or near the center. Variations of this basic five spot pattern are well known, but in all patterns employed in enhanced recovery processes, there will be a determinable recovery zone within each unit of the pattern in which the pore volume of that unit is determinable based on the well spacing, formation thickness, sweep efficiency of the pattern employed, and formation porosity. The volume of surfactant solution and other fluids employed is then conveniently expressed in terms of a fraction or multiple of the pore volume determined for each pattern.

In applying surfactant water flooding enhanced oil recovery procedures to subterranean formations which have been previously exploited by primary and secondary recovery, it is common in practicing state of the art enhanced recovery techniques to inject other fluids into the formation prior to or subsequent to the injection of the surfactant fluid, and it is contemplated that such fluids may be employed in connection with the process of this invention. The injection of water of a different salinity than is present in the formation at the time enhanced recovery operations are begun in order to alter the salinity of the water present in the formation is frequently used and may be used in connection with the process of my invention, although the preferred method of operating in the procedure of my invention involves adjusting the surfactant solution to provide optimum performance at the salinity existing in the formation rather than attempt to vary the salinity of the formation to fit the requirements of the surfactant solution. Other fluids injected into the formation prior to injection of the surfactant solution for accomplishing other purposes are also known in the art and may be employed in connection with this invention. Such pretreatment processes include injection of aqueous solutions of sacrificial agents which are absorbed by the formation rock matrix and therefore cause a reduction in the tendency for the formation to absorb surfactant from the subsequently injected surfactant solution. Although many inorganic salts have been described in the literature for use as sacrificial agents, such as sodium carbonate, in applying the process of this invention to formations containing high salinity water which commonly also contain relatively high concentrations of divalent ions such as calcium or magnesium which forms insoluble precipitates with most sacrificial inorganic salts, other sacrificial agents may be necessary to prevent absorption of surfactant. Lignosulfonates as well as certain modified lignosulfonates have been described in the literature and are suitable for use in connection with this invention for this purpose.

Another step commonly practiced in state of the art enhanced oil recovery procedures involves injection of an aqueous fluid into the formation subsequent to injection of the surfactant solution for the purpose of improving the displacement efficiency of the enhanced oil recovery process. The fluid injected after the surfactant fluid must exhibit fluid mobility in the earth formation less than the mobility of the previously injected fluids and less than the mobility of petroleum in order to improve the sweep efficiency of the process. Hydrophilic polymers such as polyacrylamide or polysaccharide are commonly employed in the industry for this purpose. Such polymers are expensive and frequently produce undesirable reactions with the surfactant fluids injected. In certain preferred embodiments of the process of my invention, the inclusion of an amount of hydrocarbon within the critical concentration range as described herein in the surfactant fluid not only reduces separation tendencies and improves the stability of the fluid, it also produces an unexpectedly significantly increase in the viscosity of the surfactant fluid. In such instances, the use of the polymer fluid may not be necessary with the perferred embodiments of the process of my invention are employed.

The surfactant fluid injected into the formation in practicing the process of my invention is an aqueous solution containing at least one surfactant which is an ethoxylated and sulfonated surfactant having the following formula:

wherein $R_1$ is an alkyl radical having from 5 to 20 and preferably from 8 to 14 carbon atoms, $R_2$ and $R_3$ are each independently hydrogen, methyl, or alkyl radials having from 5 to 20 and preferably 8 to 14 carbon atoms, $R_4$ is ethylene or a mixture of ethylene and higher alkylene such as propylene with relatively more ethylene than higher alkylene, x is a number from 1 to 10 and preferably 2 to 8, $R_5$ is ethylene, propylene, hydroxypropylene, or butylene, and M is a monovalent ion, preferably sodium potassium or ammonium.

For example, when $R_1$ is a $C_9$ alkyl and $R_2$ and $R_3$ are both hydrogen, $R_4$ is ethylene, $R_5$ is ethylene and x is 4, the surfactant is a perferred species of my invention which is nonylbenzenetetraethoxyethylene sulfonate. I have found that dialkylbenzene species of my invention provide especially superior performance, and so the dialkylbenzenepolyalkoxyalkylene sulfonates are particularly preferred embodiments.

In a preferred embodiment of my invention, the above described alkylarylpolyalkoxyalkylene sulfonate is used as substantially the only surfactant present in the surfactant solution injected into the formation. In this single surfactant embodiment the concentration of the surfactant is from 0.5 to 10 and preferably from 1 to 5% by weight.

In another embodiment of the process of my invention, the aqueous solution also contains petroleum sulfonate or other less expensive organic sulfonates. It is preferred that the petroleum sulfonate be at least partially water soluble with an average equivalent weight at a range of from about 350 to 450. The concentration of petroleum sulfonate will be from 1 to 10% and preferably 1.5 to 5% by weight and in this instance the alkylarylpolyalkoxyalkylene sulfonate is used as a solubilizing cosurfactant, and the concentration is from 0.1 to 5 and preferably 0.5 to 3% by weight. The ratio of the alkylarylpolyalkoxyalkylene sulfonate to petroleum sulfonate should be from 0.05 to 1 and preferably from 0.1 to 1.0.

The water which makes up the aqueous medium of the fluid mixture of my invention may be either hard or soft. My invention has been found to be particularly useful in hard water which contains large amounts of divalent ions. That is, my invention is especially effective for stabilizing aqueous surfactant solutions in which the aqueous medium contains large amounts of calcium and/or magnesium ions and is considered hard water. It is in these hard waters that some surfactants are particularly prone to be unstable. It is known in the art that surfactants such as petroleum sulfonates are not at all compatible with calcium and magnesium ions in hard water. Recent discoveries have shown that the sulfonates of alkylene oxide adducts of substituted phenols are compatible with calcium and magnesium ions in hard water or brine but their stability, that is their ability to remain in solution under all conditions of temperature and water hardness and salinity is at times a problem. Therefore, my invention while including all types of water is particularly directed to hard water brines. Hard water may be defined an aqueous solution containing from 100-20,000 parts per million polyvalent metal ions such as calcium and/or magnesium ions. Brines contain 0.0 to 25% by weight sodium chloride and may contain various amounts of other dissolved salts such as sodium bicarbonate, sodium sulfate, and sodium borate. My invention is operable in hard water, brines or hard water brines.

The water may incidentally also contain dissolved hydrogen sulfide, carbon dioxide, methane or other gases.

The hydrocarbons useful in my invention include paraffinic hydrocarbons, such as any normally liquid petroleum cut obtained in a fractionation process from crude oil. The skilled practitioner will be able to select the most useful hydrocarbon in a given surfactant system. Particularly useful in my invention is $C_7$ to $C_{14}$ and preferably $C_8$ to $C_{12}$ paraffinic hydrocarbon such as heptane, octane, nonane etc. Commercial mixtures such as naphtha, kerosine, gasoline and diesel oil are also suitable for use in my invention.

The amount of hydrocarbon to be used in my invention is very critical. Only the very smallest amount which is found to render stability to the aqueous surfactant solution should be used. It has been discovered that, in general, the concentration of hydrocarbon should be from 0.001 to 0.75 and preferably from 0.01 to 0.5% by volume. This amount may vary from system to system as the surfactant type or water change, but it has been found, as will be shown below, that when the hydrocarbon concentration exceeds the critical concentration range which lends stability, instability again results. This surprising result makes the amount of hydrocarbon very critical. In the surfactant systems described below, the effective range of hydrocarbon concentration in the fluid was from 0.015% to about 0.5%. It is clear that the amount of hydrocarbon is critical and only that amount which will lend stability to the aqueous surfactant system can be used in the process of my invention. Any amount above that will yield an unstable aqueous surfactant solution and is not within the scope of my invention.

Figure 1:
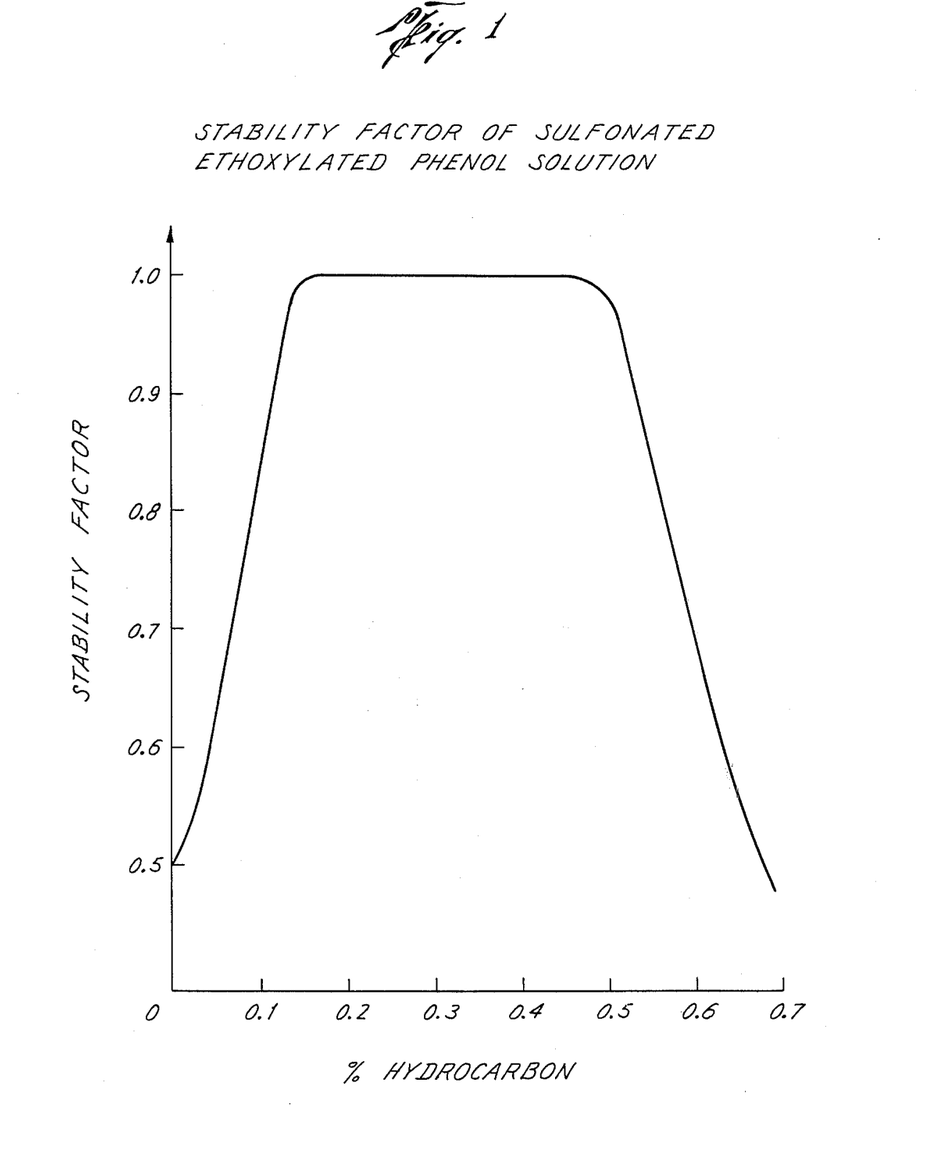
FIG. 1 illustrates the variation in stability factor of an aqueous solution of sulfonated, ethoxylated phenol surfactant with varying amounts of hydrocarbon.

If an aqueous, saline solution of an alkylarylpolyalkoxyalkylene sulfonate is prepared and the stability is examined in a procedure to be described more fully below, it will be observed that a narrow region of stability can be identified such as is illustrated in FIG. 1. In this illustration, the stability factor of an aqueous solution of dodecylbenzenetetraethoxyethylene sulfonate is identified as the percent of hydrocarbon present in the fluid goes from 0 to about 0.7% by volume. In the region from 0 to about 0.15%, the fluid is unstable. In this region, instability is noted by the formation after several days of a white gelatinous phase which settles to the bottom of the surfactant solution, i.e. the density of the separated phase is greater than the density of the bulk of the aqueous surfactant solution. When the concentration of hydrocarbon exceeds the optimum range for stabilization, separation again occurs although the observed separation is somewhat different in the region to the right of the concentration corresponding to optimum stabilization than is observed in the region of FIG. 1 to the left of the stable zone. When in the example illustrated in FIG. 1, the concentration of hydrocarbon exceeds the optimum amount for stabilization of the surfactant, a distinct phase separates from the aqueous solution, but the density of the separated phase is less than the density of the aqueous fluid, so a surfactant rich layer floats on top of the aqueous solution. In the stable zone illustrated in FIG. 1, no separate phases occur and an "emulsion" layer is not formed in this instance. It is believed that the small amount of hydrocarbon added in the stabilizing zone according to the process of my invention accumulates in the interfacial zone or film between the micells of surfactant and the aqueous phase of the solution, or in other fashion concentrates into micells but without the formation of separate hydrocarbon droplets disbursed in the aqueous phase. When the amount of hydrocarbon employed is within the concentration which produces the benefit described herein, neither a conventional emulsion nor a microemulsion is formed, the fluid being essentially a pure solution or at most a micellar dispersion of surfactant.

EXPERIMENTAL

EXAMPLE 1

Three sulfonated alkylene oxide adducts of alkyl-substituted phenols were employed in the following experiment to demonstrate the invention. The adducts were three, four and five mole ethylene oxide adducts of dodecyl phenol which had been sulfonated. Stock solutions of the above adducts were prepared in Slaughter central tank battery brine water. (The Total Dissolved Solids in this water was 94,697 ppm (mg/l) including 7,100 ppm of $Ca^{++}$ and 1,800 ppm $Mg^{++}$.) These stocks were mixed to prepare intermediate ethylene oxide adducts. For example, a 4.5 mole ethylene oxide adduct was prepared by mixing equal volumes of 10 $kg/m^3$ solution of the adduct containing five ethylene oxide groups and 10 $kg/m^3$ solution of the adducts containing four ethylene oxide groups. After shearing the fluid, the exact concentration was determined by titration. The solutions were maintained in a 43° C. oven for several days without agitation.

Figure 2:
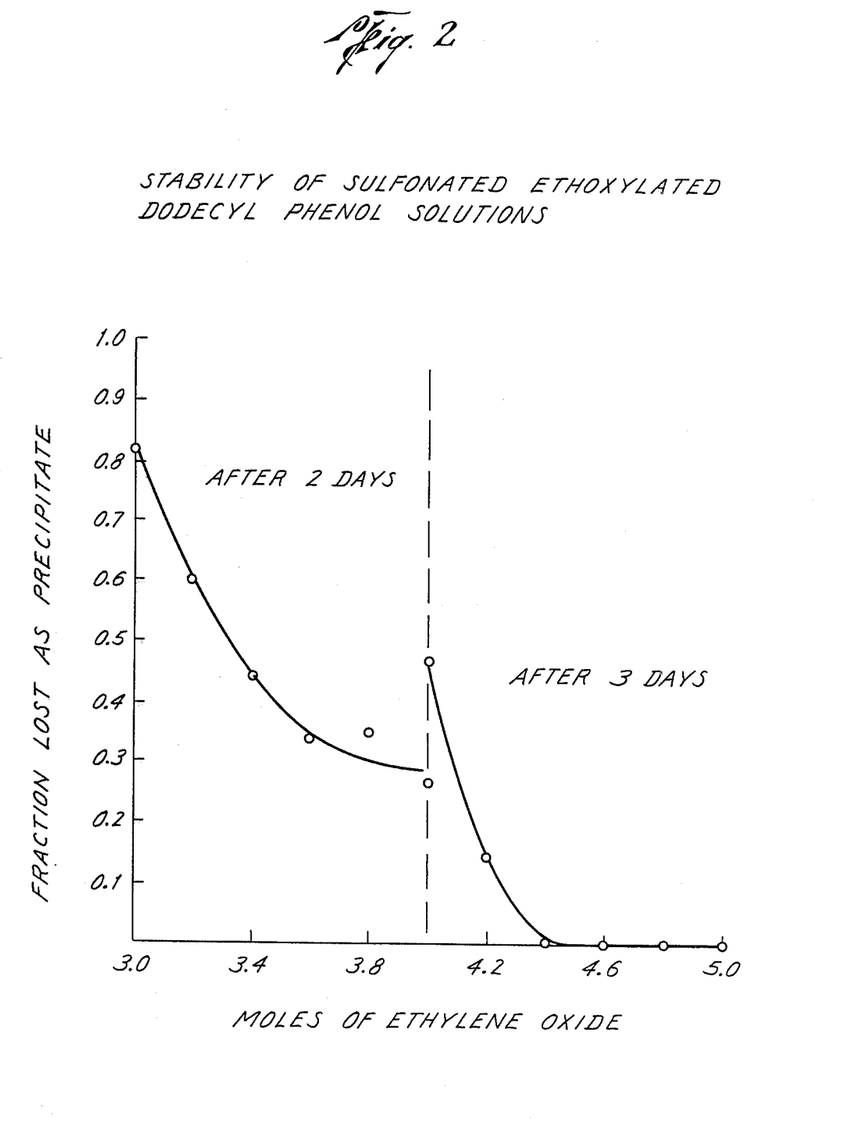
FIG. 2 illustrates the stability of sulfonated ethoxylated dodecyl phenol solutions with the number of moles of ethylene oxide varied from 3 to about 4.4. Stabilities after two day and three days aging time are illustrated.

Surfactant separated from some of the solutions as a white gelatinous precipitate on the bottom of the container. Surfactant loss was quantified by titration of the upper phase. The results (FIG. 2) clearly show that the surfactant solutions were not stable.

Figure 3:
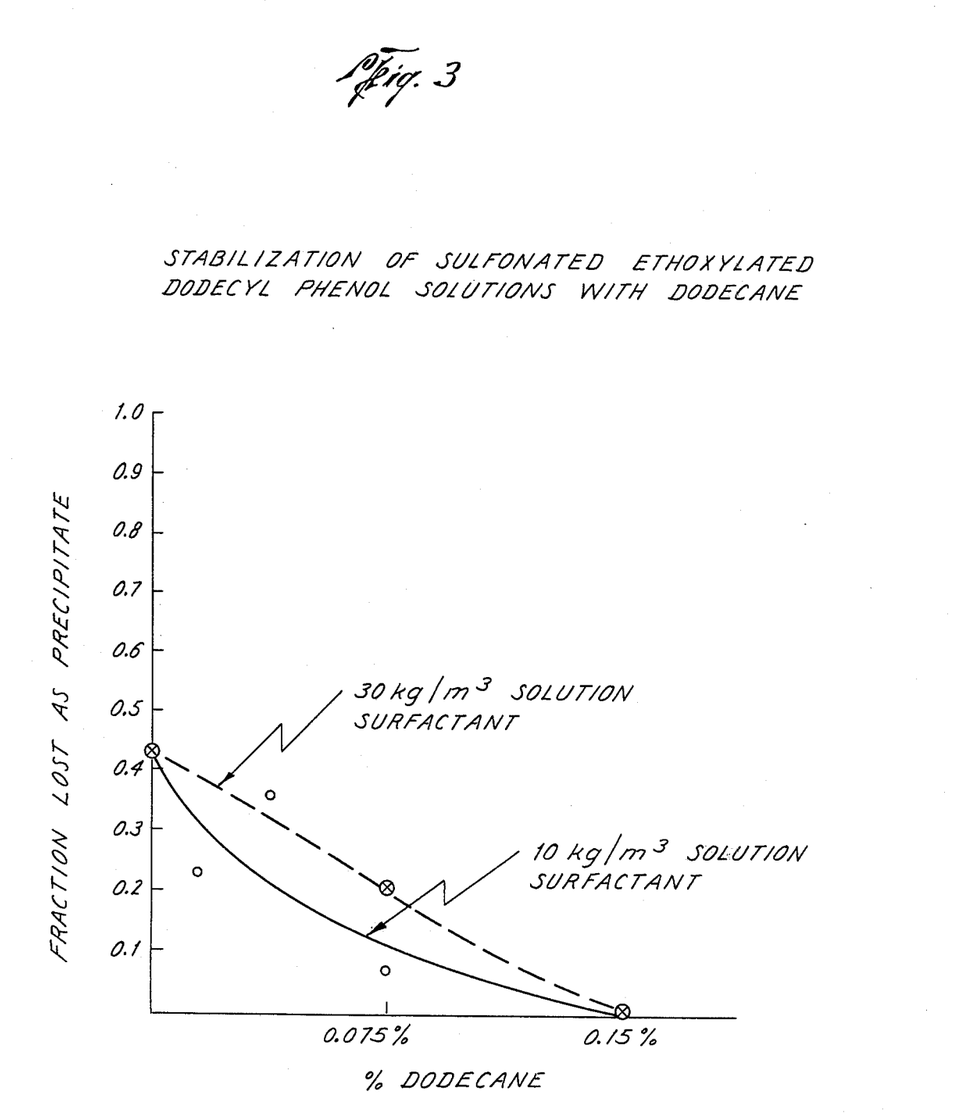
FIG. 3 illustrates the stabilization of a sulfonated ethoxylated dodecyl phenol solution with dodecane, with the concentration of dodecane being varied from 0 to 0.15%.

The adduct containing four ethylene oxide groups was modified by adding varying amounts of dodecane. Each of these concentrates (containing 13.1% active sulfonate compound) with added dodecane was sealed in a bottle and stirred while heating in a boiling water bath. After cooling, it was noted that the concentrate with 2 grams of dodecane per 100 grams of the original ethylene oxide concentrate was much less viscous than the concentrate with less dodecane. The concentrates with added dodecane were used to prepare dilute solutions in the slaughter water. The resulting solutions contained 0.075% and 0.15% dodecane. The stability of these solutions was determined as before. These tests indicate that dodecane stabilized these solutions (FIG. 3).

EXAMPLE 2

The purpose of this experiment is to determine the effect on one percent aqueous solutions of a sulfonated 3.5 mole ethylene oxide adduct of dodecyl phenol, (The 3.5 ethylene oxide adduct used in Example 2 was a mixture of 90% dodecyl phenol adduct and 10% di-dodecyl phenol adduct. The hydrocarbon concentration was 0.2% or 2 $kg/m^3$) of addition of various crude oil distillation products at a concentration of 0.2%. The hydrocarbon distillates were obtained by packed column distillation of Slaughter E-2 crude oil. The following procedure was used to prepare the surfactant solutions:

(1) Mix distillates, E-2 crude oil or dodecane with the surfactant concentrates,
(2) Add Slaughter central tank battery water, and
(3) Shear the solution in a Waring blender.

Interfacial tensions in oil recovery for the various solutions were determined and recorded in the following table. The interfacial tensions were determined at room temperature by the Sessil Drop method. E-2 oil with 0.25 $m^3/m^3$ heptane was used as the hydrocarbon phase. Interfacial tensions were lowest with solutions containing the 90°–110° C. and 140°–150° C. distillates.

When no hydrocarbon was added to the surfactant solution, some surfactant separated from solution as a dense viscous phase having a white, gelatinous appearance. The surfactant loss from solutions was determined by solution titration and the results are given below. Surfactant separation was alleviated by hyrocarbon addition. The surfactant solution with hydrocarbon which produces the desired high viscosity surfactant fluid.

Figure 6:
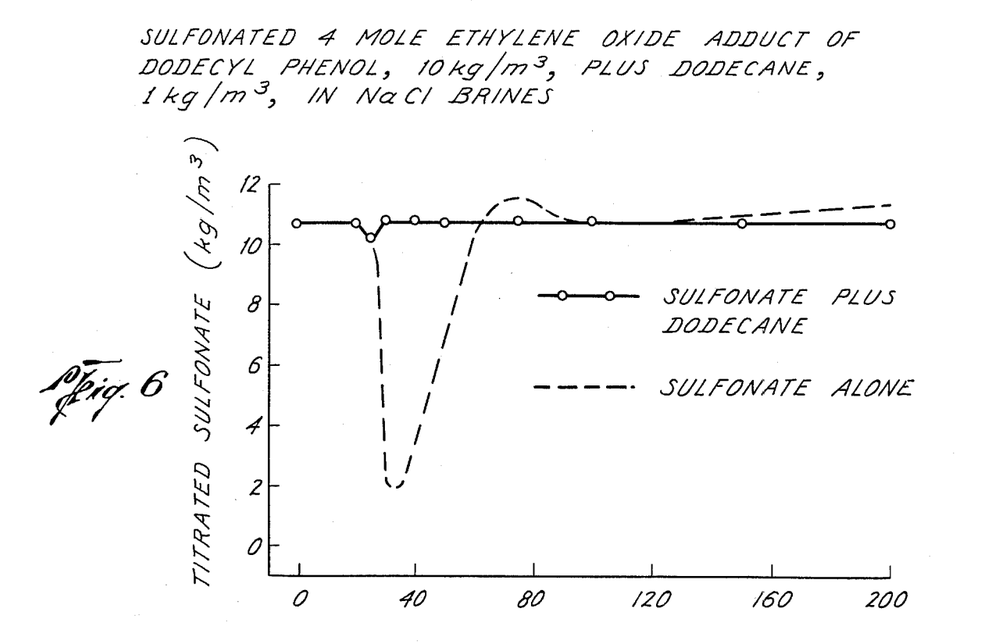
FIG. 6 illustrates the unstable region of an aqueous solution of dodecylbenzenetetraethoxyethylene sulfonate as the salinity of the solution is varied, and how the instability problem is corrected by addition of dodecane to the solution.
Figure 7:
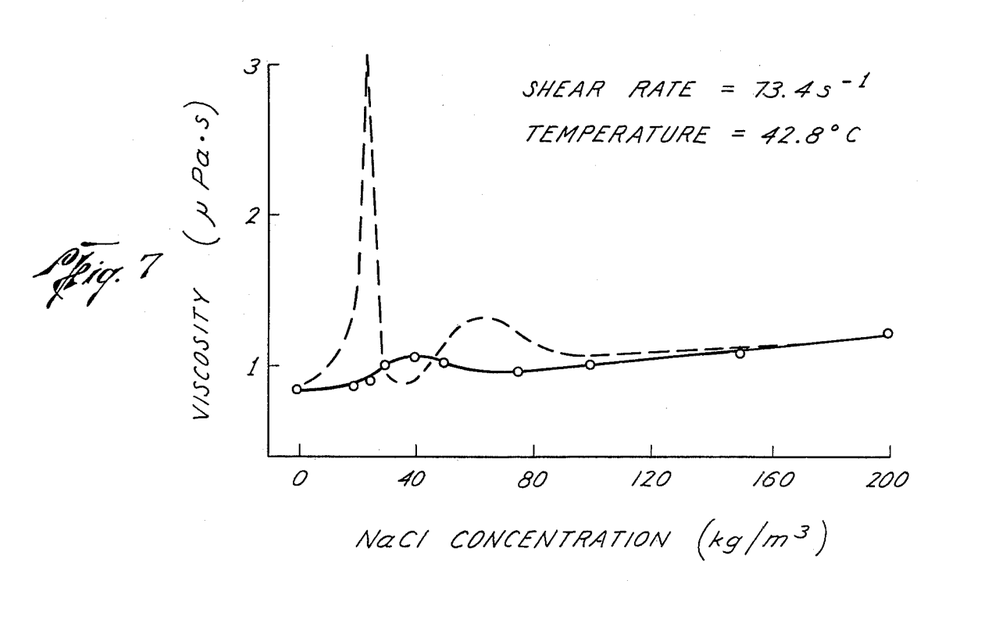
FIG. 7 illustrates the variation in viscosity of aqueous solutions of dodecylbenzenetetraethoxyethylene sulfonate.

As can be seen in FIGS. 6 and 7, the magnitude of the viscosity effect is sometimes altered dramatically by a choice of a different surfactant and a different hydrocarbon. If it is desired to achieve the favorable mobility ratio by producing a viscous surfactant fluid, then the choice of surfactant, hydrocarbon, as well as aqueous fluid salinity must be considered in choosing the surfactant fluid to be employed in a particular application of this oil recovery process.

While my invention has been described in terms of a number of illustrative embodiments, it is clearly not so limited since many variations thereof will be apparent to person skilled in the art of surfactant water flooding enhanced oil recovery processes, without departing from the spirit in scope of my invention. Also, while explanations have been offered for certain observed phenomena, it is not necessarily represented that these are the only phenomena causing the observed results and benefits from practice of the process of my invention. It is my desire and intention that my invention be limited and restricted only by those limitations and restrictions appearing in the claims appended immediately hereinafter below.

I claim:

1. A method for recovering petroleum from a subterranean, petroleum-containing formation penetrated by a injection well and by a spaced-apart production well, both wells being in fluid communication with the formation, said formation containing water of salinity greater than 50,000 parts per million total dissolved solids, the formation temperature exceeding 150°, comprising injecting an aqueous, saline, surfactant-containing solution into the formation to displace petroleum through the formation, said fluid containing at least one surfactant of the formula wherein $R_1$ is an alkyl radical having from 5 to 20 carbon atoms, $R_2$ and $R_3$ are each independently hydrogen, methyl, or alkyl radicals having from 5 to 20 carbon atoms, $R_4$ is ethylene or a mixture of ethylene and higher alkylene such as propylene with relatively more ethylene than higher alkylene, x is a number from 1 to 10, $R_5$ is ethylene, propylene, hydroxypropylene, or butylene, and M is a monovalent cation, and an amount of liquid hydrocarbon sufficient to avoid precipitation of surfactant from the solution and to prevent phase separation of the solution, said amount of hydrocarbon being less than the amount which would form a microemulsion, the amount of hydrocarbon being determined and the aqueous saline surfactant solution being prepared by:

(a) preparing a series of aqueous saline samples containing a predetermined concentration of said surfactant, and liquid hydrocabon of different concentrations from one another, with the concentration of liquid hydrocarbon in the samples being in the range from 0 to 0.7 percent by volume;

(b) identifying a first concentration of hydrocarbon below which a white gelatinous phase having density greater than the density of the bulk of the aqueous solution separates to the bottom of the samples;

(c) identifying a second concentration above which separation of the aqueous samples into two distinct phases occurs, with a separated phase having density less than the density of the aqueous solution accumulating on top of the aqueous solution; and (d) preparing the aqueous saline surfactant containing fluid solution injected into the formation with the concentration of liquid hydrocarbon which is greater than the first concentration and less than the second concentration identified above.

2. A method as recited in claim 1 wherein $R_1$ is an alkyl radical containing from 8 to 14 carbon atoms.

3. A method as recited in claim 1 wherein $R_3$ is hydrogen and $R_1$ and $R_2$ are alkyl radicals containing from 8 to 14 carbon atoms.

4. A method as recited in claim 1 wherein $R_4$ is ethylene.

5. A method as recited in claim 1 wherein x is from 2 to 8 carbon atoms.

6. A method as recited in claim 1 wherein $R_5$ is ethylene.

7. A method as recited in claim 1 wherein $R_5$ is propylene.

8. A method as recited in claim 1 wherein $R_5$ is hydroxy propylene.

9. A method as recited in claim 1 wherein $R_5$ is butylene.

10. A method as recited in claim 1 wherein the hydrocarbon is selected from the group consisting of C 6 to C 16 paraffinic hydrocarbons, kerosine, naphtha, gasoline, diesel oil, and mixtures thereof.

11. A method as recited in claim 1 wherein the hydrocarbon is selected from the group consisting of C 8 to C 14 paraffinic hydrocarbon, kerosine, naphtha, gasoline, diesel oil and mixtures thereof.

12. A method as recited in claim 1 wherein the salinity of the aqueous surfactant-solution is chosen to be within a range of salinities which produce an aqueous surfactant fluid viscosity at which the surfactant fluid mobility is less than the mobility of the crude oil present in the formation.

13. A method as recited in claim 12 wherein the salinity of the aqueous fluid is selected at or near the mid point of the range of fluid salinity values which cause the surfactant fluid viscosity to be of a value which insures that the mobility of the surfactant fluid is less than the mobility of the petroleum present in the formation.

14. A method as recited in claim 12 wherein the surfactant, hydrocarbon and aqueous fluid salinity are chosen to produce a maximum fluid viscosity.

* * * * * additives were tested for tertiary oil recovery using Berea cores at Slaughter field conditions. The results of the floods are summarized below. The results indicate consistently good oil recoveries with all hydrocarbon additives.

When more than 0.5% dodecane was added to this one percent surfactant solution phase, instability (separation) began to occur again. As in mentioned above, the instability of fluids containing over 0.5% was detected by observing the occurrence of a separate phase which is less dense than the aqueous solution. The amount of phase detectable on the top of the aqueous solution of surfactant was generally proportional to the amount by which the hydrocarbon content exceeded the upper critical level for treatment in accordance with the invention of my process as described herein. When the amount of hydrocarbon used was less than the minimum amount shown in FIG. 1, the effect could be measured directly as a loss in surfactant concentration from the solution. When the amount of hydrocarbon exceeded the critical maximum concentration, the effect is detected as a reduction in surfactant fluid effectiveness for oil recovery purposes.

STABILITY AND INTERFACIAL TENSIONS OF ONE PERCENT SURFACTANT

| Hydrocarbon Additive at 0.2% | Interfacial Tension, millidyne/cm | Surfactant Separation, kg/kg | |
|---|---|---|---|
| | | 3 days | 2 months |
| None | — | 0.35 | — |
| E-2 crude oil | — | 0.00 | — |
| Dodecane | 23 | 0.00 | 0.03 |
| 90–110° C. | 9 | 0.00 | 0.00 |
| 130–150° C. | 8 | 0.04 | 0.04 |
| 170–200° C. | 28 | 0.05 | 0.14 |
| 220–240° C. | 11 | 0.05 | 0.08 |
| 240–260° C. | 16 | 0.08 | 0.06 |

TERTIARY OIL RECOVERIES

| Hydrocarbon (cut) Additive at 0.2% | Tertiary Oil Recovery* | | | |
|---|---|---|---|---|
| | $S_{owf}$ | $S_o$ | $S_{ch}F$ | $E_r$ |
| E-2 crude oil | .342 | .184 | .158 | .536 |
| Dodecane | .236 | .121 | .115 | .511 |
| 90–110C | .286 | .149 | .137 | .523 |
| 130–150C | .303 | .178 | .125 | .587 |
| 170–200C | .302 | .168 | .134 | .558 |
| 240–260C | .276 | .143 | .133 | .517 |

*$S_{owf}$ oil saturated after water flooding core
$S_o$ oil saturation change after chemical flooding
$S_{chf}$ oil saturation after chemical flood
$E_r$ fraction of oil recovered due to chemical flood $\frac{S_o}{S_{owf}}$

EXAMPLE 3

The purpose of this experiment was to determine the effect of hydrocarbon additives on the phase stability and viscosity of sulfonated four mole ethylene oxide adducts of nonylphenol and sulfonated four mole ethylene oxide adducts of dodecyl phenol in sodium chloride brines. Surfactant solutions were prepared using the above enumerated surfactants with and without dodecane and the results are shown in FIGS. 4, 5, 6, and 7. As is clear from the figures, there are critical salinity concentration regions where the aqueous surfactant solutions are unstable and separate easily from solution. It is noted that when dodecane in a concentration of 0.1 weight percent is added, stability is maintained across the salinity concentration regions which previously experienced instability.

Figure 4:
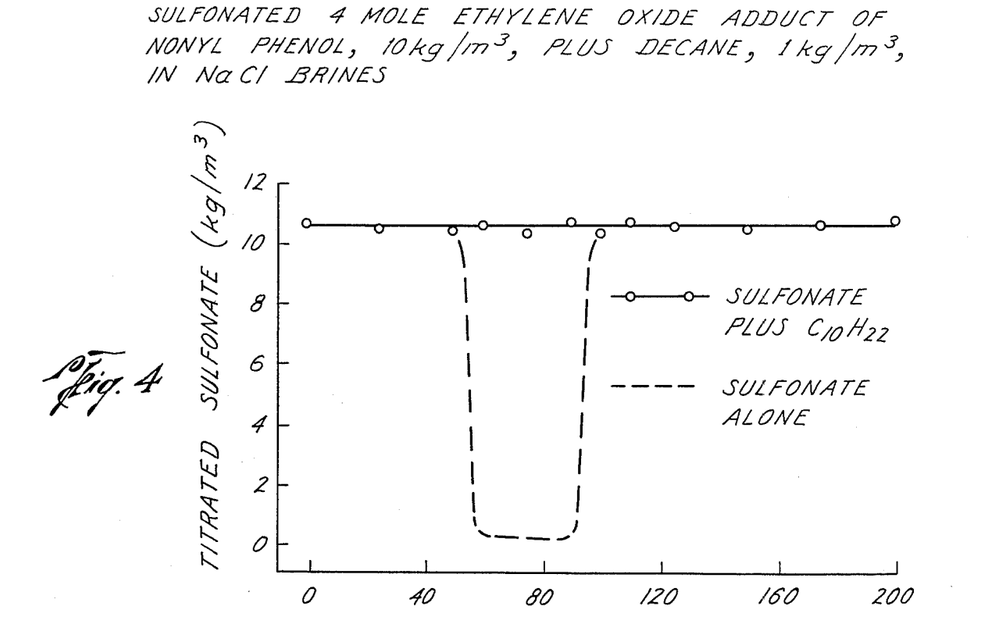
FIG. 4 illustrates how the instability of an aqueous solution of nonylbenzenetetraethoxyethylene sulfonate varies with the salinity of the aqueous solution, and how the instability is eliminated when decane is added to the solution.

FIG. 4 illustrates in particular how the loss in surfactant is highly influenced by the salinity of the fluid, when no hydocarbon is present, and how this loss is eliminated altogether by inclusion of hydrocarbon in the surfactant fluid.

Figure 5:
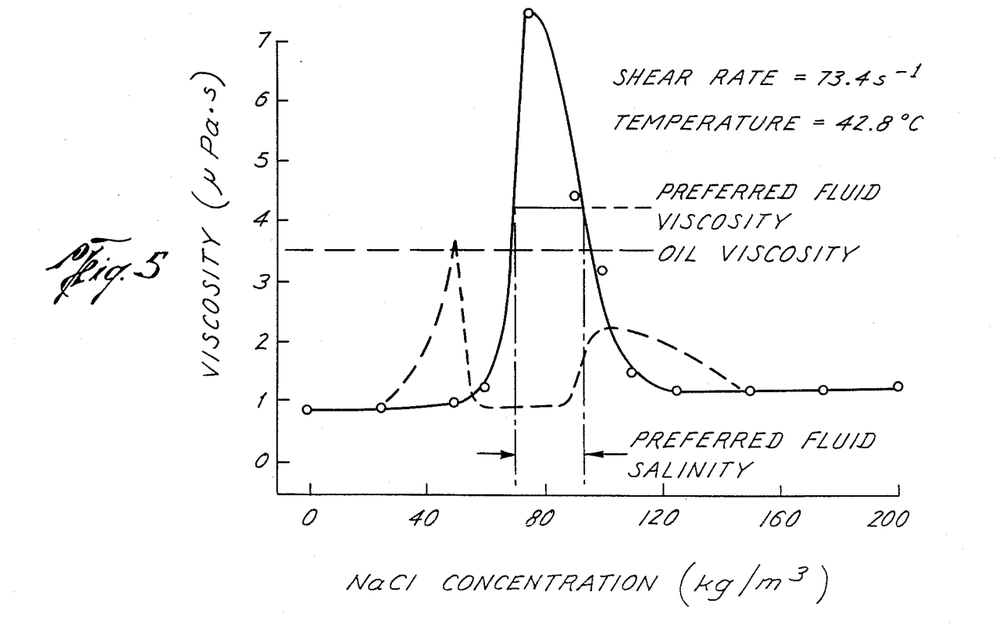
FIG. 5 illustrates the viscosity of an aqueous solution of nonylbenzenetetraethoxyethylene sulfonate containing a small amount of decane, with varying values of salinity.

FIG. 5 illustrates a particularly surprising and unexpected characteristic of the process of my invention. It can be seen that the viscosity of a surfactant solution containing no hydrocarbon exhibits a maximum value as the salinity of the fluid is changed, this value being about three times the viscosity of the fluid base level and corresponding to a salinity of about 40,000 parts per million total dissolved solids. Surprisingly, when the fluid also contains hydrocarbon, the amount by which the viscosity is increased in a selected range of salinity values is significantly greater than for the fluid without hydrocarbon. It is also surprising that the range of aqueous fluid salinity values at which the viscosity peak occurs is considerably greater for the fluid containing hydrocarbon than it is for the fluid containing no hydrocarbon. As can be seen from FIG. 5, the maximum viscosity is nearly seven times the base fluid viscosity values. It is this unexpected result which gives rise to the especially preferred embodiment in the process of my invention, in which the amount of hydrocarbon added to the fluid is sufficient to insure stability and avoid phase separation in the fluid, and the salinity of the fluid is adjusted to produce a viscosity which insures that the displacing fluid (the surfactant fluid) is less mobile than the displaced fluid (the formation crude oil). Mobility is dependent on viscosity but it is also influenced by other factors, so it is not absolutely necessary that the viscosity of the surfactant fluid exceed the viscosity of the crude oil in the formation and formation conditions to ensure that the mobility ratio is favorable for efficient displacement. It is sometimes possible to achieve a favorable mobility ratio (i.e. the mobility of the displacing fluid is less than the mobility of the displaced fluid) even though the viscosity of the displacing fluid less than the viscosity of the displaced fluid. It is necessary to increase the viscosity of the surfactant fluid over its natural value somewhat in order to achieve this favorable mobility ratio. Methods for determining the mobility of fluids under actual formation conditions, all of which influence the effective mobility of the fluids during fluid displacement processes, is well documented in the prior art. Accordingly the preferred fluid viscosity need not exceed the oil viscosity, although it is always necessary to increase the viscosity of the surfactant fluid in order to insure that the mobility of the surfactant fluid is less than the mobility of the crude oil. If the viscosity of surfactant fluid exceeds the viscosity of the oil being displaced in the formation, then the desired mobility ratio is assured. As can be seen from FIG. 5, the range of salinity values corresponding to the preferred fluid viscosity are from about 70,000 parts per million to about 95,000 parts per million total dissolved solids. So long as the salinity of the aqueous surfactant solution is within this range, the desired preferred fluid viscosity will be maintained for this particular surfactant and aqueous fluid. It is generally considered good practice to operate near the center of a target range, so variations of the mixing procedure or dilution effects in the formation will not cause the fluid viscosity to exceed or be less than the critical fluid salinity range